(12) United States Patent
Cunningham

(10) Patent No.: US 6,675,575 B1
(45) Date of Patent: Jan. 13, 2004

(54) HYDROSTATIC DRIVE

(75) Inventor: Sinclair Cunningham, Scotland (GB)

(73) Assignee: Bosch Rexroth AG, Lohr am Main (DE)

(*) Notice: Subject to any disclaimer, the term of this patent is extended or adjusted under 35 U.S.C. 154(b) by 0 days.

(21) Appl. No.: 10/019,978

(22) PCT Filed: Jun. 28, 2000

(86) PCT No.: PCT/EP00/06029
§ 371 (c)(1),
(2), (4) Date: May 30, 2002

(87) PCT Pub. No.: WO01/02205
PCT Pub. Date: Jan. 11, 2001

(30) Foreign Application Priority Data

Jul. 1, 1999 (DE) .......................... 199 30 425

(51) Int. Cl.$^7$ ............................................. B60K 17/356
(52) U.S. Cl. ........................... 60/425; 60/468; 180/242; 180/308
(58) Field of Search ................... 60/425, 468; 180/197, 180/242, 308

(56) References Cited

U.S. PATENT DOCUMENTS

| | | | |
|---|---|---|---|
| 5,199,525 A | * | 4/1993 | Schueler ...................... 60/468 |
| 5,201,570 A | | 4/1993 | Heren et al. |
| 5,730,041 A | * | 3/1998 | Fillion et al. ............... 180/197 |
| 6,386,307 B1 | * | 5/2002 | Martin et al. ............... 180/242 |

FOREIGN PATENT DOCUMENTS

| | | |
|---|---|---|
| DE | 1 580 504 | 5/1970 |
| DE | 2026910 | 12/1971 |
| DE | 2242259 | 3/1973 |
| EP | 0 378 742 A2 | 7/1990 |
| EP | 0 505 254 A1 | 9/1992 |
| EP | 0 547 947 A1 | 6/1993 |
| EP | 0 816 153 | 1/1998 |
| GB | 863560 | 1/1960 |

OTHER PUBLICATIONS

Abstract of Japanese Laid–Open Application No. 08034252.

* cited by examiner

Primary Examiner—Thomas E. Lazo
(74) Attorney, Agent, or Firm—Scully, Scott, Murphy & Presser

(57) ABSTRACT

The invention relates to a hydrostatic drive (1) with a hydraulic pump (2) and a first hydraulic engine (10) that is linked with the hydraulic pump (2) via a first working line section (4), the hydraulic engine driving a first drive train (11). The hydrostatic drive further comprises a second hydraulic engine (14) that is linked with the first hydraulic engine (10) via a second working line section (5), the second hydraulic engine driving a second drive train (15). The second hydraulic engine (14) is linked with the hydraulic pump (3) via a third working line section (6). According to the invention, an on-off valve (8) is located in the first working line section (4) and the second working line section (5). When a slip arises at the first drive train (11), said on-off valve can link the first working line section (5) with the second working line section (5) directly, that is while by-passing the first hydraulic engine (10).

10 Claims, 2 Drawing Sheets

HYDROSTATIC DRIVE

BACKGROUND OF THE INVENTION

1. Field of the Invention

The invention relates to a hydrostatic drive for driving various types of vehicles.

2. Discussion of the Prior Art

A hydrostatic drive for driving diverse types of vehicles is known from DE-OS 20 26 910. In the case of the hydrostatic drive disclosed in the publication, a first hydraulic pump, a first hydraulic motor, a second hydraulic pump and a second hydraulic motor are arranged in series in a working circuit. When the two hydraulic motors drive different vehicle wheels, the problem arises that, in the event of a slip at one of the vehicle wheels, the hydraulic motor connected to this vehicle wheel does not contribute to the driving of the vehicle and the efficiency of the hydrostatic drive is therefore reduced.

A further hydrostatic drive is known from EP 0 547 947 A1. In the case of the hydrostatic drive disclosed in this publication, two vehicle wheels lying opposite on a vehicle axle are driven in each case by two hydraulic motors arranged in pairs on a common shaft. The hydraulic fluid delivered in a working circuit by a hydraulic pump branches upstream of the hydraulic motors arranged in pairs. Whereas the hydraulic fluid from the outlet of one of the two hydraulic motors arranged in pairs flows back directly to the hydraulic pump, the outlet of the other hydraulic motor arranged on the same shaft is connected to the hydraulic pump via a further hydraulic motor in each case, these further hydraulic motors driving vehicle wheels of another vehicle axle. In the case of the hydrostatic drive disclosed in this publication, no measures are provided to prevent the efficiency of the drive being considerably reduced in the event of a slip at one of the vehicle wheels.

EP 0 505 254 A1 discloses a hydrostatic drive in which all the hydraulic motors driving different vehicle wheels are connected in parallel to the hydraulic pump. Speed sensors are provided at the output shafts of the individual hydraulic motors. As a function of the speeds determined at the individual output shafts, the amount of pressure fluid flowing through the assigned hydraulic motors can be regulated by adjustable, throttled branch valves, so that possible speed differences are equalised and in particular steering or exact straight-line driving is permitted. However, this arrangement has only limited use for equalising a slip at one of the vehicle wheels.

EP 0 378 742 A2 discloses a hydrostatic drive in which a first and second drive train are completely separated from each other on cornering, the first drive train having a first hydraulic pump and a first hydraulic motor and the second drive train having a second hydraulic pump and a second hydraulic motor. In order to permit as exact a straight-line driving as possible, the hydraulic motors can be mechanically connected to each other on the one hand by means of a mechanical coupling on straight-line driving. On the other hand, the separated hydraulic working circuits are hydraulically connected to each other by valves on straight-line driving. A measure for preventing the efficiency being impaired in the event of a slip at one of the two drive trains is not disclosed in this publication.

The object on which the invention is based is to provide a hydrostatic drive for driving a plurality of drive trains, in which the efficiency is not substantially reduced if a slip occurs at one of the drive trains.

SUMMARY OF THE INVENTION

The invention is based on the finding that by means of a switching valve which in the event of a slip at one of the drive trains bypasses the hydraulic motor connected to this drive train, a reduction of the efficiency can be countered by then supplying the hydraulic fluid directly to the respective other hydraulic motor not affected by the slip. The full hydraulic power of the hydraulic pump is thus available to the hydraulic motor not affected by the slip.

Advantageous developments of the invention are disclosed in the subclaims.

It is advantageous to assign a switching valve to each hydraulic motor, so that when a slip occurs at one of the drive trains the hydraulic motor assigned to this drive train can be bypassed by the assigned switching valve.

The switching valves can be driven by the pressure drop at the hydraulic motor assigned to the respective switching valve or else by the pressure drop at the other hydraulic motor or hydraulic motors. One criterion for the occurrence of a slip at a drive train is either a marked reduction of the pressure drop at the hydraulic motor assigned to this drive train or a marked increase of the pressure drop at the other hydraulic motor or hydraulic motors.

Alternatively, the occurrence of a slip can also be detected by comparing the speeds at the different drive trains. If the different drive trains drive different wheels of the vehicle, which, given an identical wheel diameter, rotate at an identical speed in the event of a slip-free drive, a deviation of the speeds at the differently driven vehicle wheels indicates an occurrence of a slip at that vehicle wheel which has a markedly higher speed than the other vehicle wheels.

BRIEF DESCRIPTION OF THE DRAWINGS

Exemplary embodiments of the invention are described in more detail below with reference to the drawing, in which.

DETAILED DESCRIPTION OF THE PREFERRED EMBODIMENTS

Figure 1:
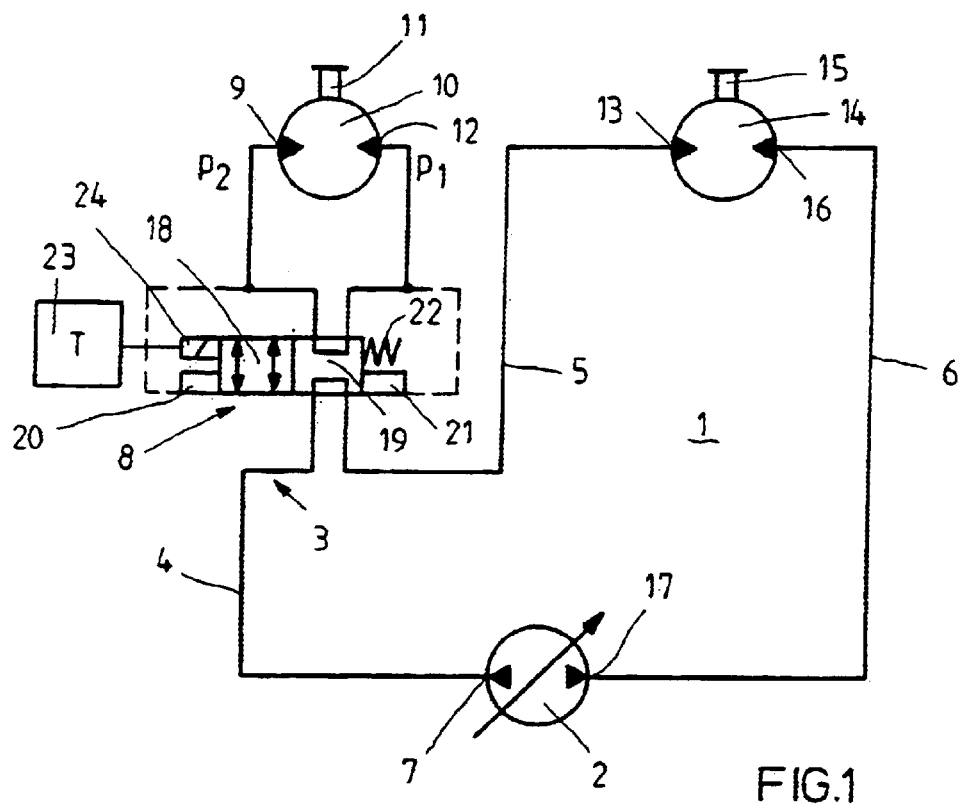
FIG. 1 shows a basic hydraulic and electrical circuit diagram of a first exemplary embodiment of the invention.

FIG. 1 shows a basic circuit diagram of a first exemplary embodiment of the invention. The hydrostatic drive 1 according to the invention consists of a preferably adjustable hydraulic pump 2, which is driven for example by an internal combustion engine (not illustrated). A working line 3 comprises a first working line section 4, a second working line section 5 and a third working line section 6.

In a normal state, which is to be considered first of all, when no slip occurs at the drive 1 according to the invention, the first working line section 4 connects a first connection 7 of the hydraulic pump 2 via a switching valve 8 to a first connection 9 of a first hydraulic motor 10. The first hydraulic motor 10 drives, via a first drive train 11, for example the front wheels of a vehicle. In this normal state, the second working line section 5 connects a second connection 12 of the first hydraulic motor 10 via the switching valve 8 to a first connection 13 of a second hydraulic motor 14. The second hydraulic motor 14 drives, via a second drive train 15, for example the rear wheels of the vehicle. Finally, the third working line section 6 connects a second connection 16 of the second hydraulic motor 14 to a second connection 17 of the hydraulic pump 2.

In the above-described normal state, which corresponds to the first switching position 18 of the switching valve 8, the switching valve 8 connects the first connection 7 of the hydraulic pump 2 to the first connection 9 of the first hydraulic motor 10 and the second connection 12 of the first hydraulic motor 10 to the first connection 13 of the second hydraulic motor 14. In a second switching position 19, however, the switching valve 8 connects the first working line section 4 directly to the second working line sections 5 while bypassing the first hydraulic motor 10, so that the first connection 7 of the hydraulic pump 2 is connected directly to the first connection 13 of the second hydraulic motor 14. In this second switching position 19, the two connections 9 and 12 of the hydraulic motor 10 are short-circuited to each other via the switching valve 8. The switching valve 8 is therefore designed as a 4/2-way valve in the exemplary embodiment.

In the exemplary embodiment illustrated in FIG. 1, the switching valve 8 is driven by the pressure drop $p_2-p_1$ at the first hydraulic motor 10, i.e. the difference between the pressure $p_2$ at the first connection 9 and the pressure $p_1$ at the second connection 12 of the first hydraulic motor 10. For this purpose, a first pressure chamber 20, which is connected to the first connection 9 of the first hydraulic motor 10, and a second pressure chamber 21, which is connected to the second connection 12 of the first hydraulic motor 10, are provided.

If a slip occurs at the first drive train 11 or at the vehicle wheel driven by it, this reduces the pressure drop at the first hydraulic motor 10 and the difference $p_2-p_1$ between the pressures $p_2$ and $p_1$ is relatively small. Thus, the force exerted on the switching valve 8 by the spring 22 prevails over the opposing force exerted by the difference of the pressure $p_2$ and $p_1$ and the switching valve 8 is switched over from the first switching position 18 into the second switching position 19. Consequently, when a slip occurs at the first drive train 11 the first connection 7 of the hydraulic pump 2 is connected directly to the first connection 13 of the second hydraulic motor 14 and the hydraulic power generated by the hydraulic pump 2 in the working line 3 is transmitted directly to the second hydraulic motor 14, which is available on its own for driving. Through bypassing the upstream first hydraulic motor 10, a throttling action by the first hydraulic motor 10, which is no longer available for driving on account of the slip which has occurred, is avoided. By the measure according to the invention, it can therefore be ensured that the efficiency of the drive does not experience any substantial impairment even when a slip occurs.

In the exemplary embodiment, the switching valve 8 is restored by means of a timer 23, which at a preset time clock T of, for example, a few seconds transmits an electrical pulse to the electromagnet 24 which switches the switching valve 8 back into the first switching position 18. If a slip still occurs at the first drive train 11, the difference $p_2-p_1$ between the pressures $p_2$ and $p_1$ is still so small that the spring 22 immediately switches the switching valve 8 back into the second switching position 19 again. If in the meantime however a slip no longer occurs at the drive train 11, the switching valve 8 remains in the first switching position 18 on account of the marked difference $p_2-p_1$ which is again present between the pressures $p_2$ and $p_1$, so that the drive then takes place again both via the first hydraulic motor 10 and the first drive train 11 and via the second hydraulic motor 14 and the second drive train 15.

Figure 2:
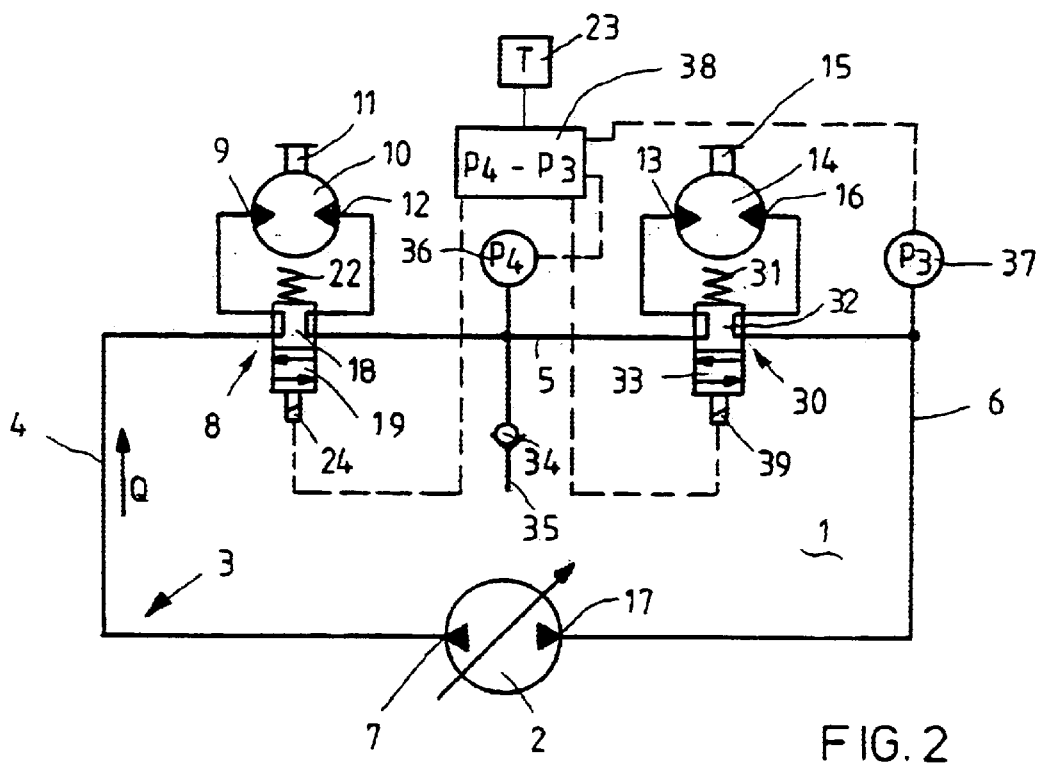
FIG. 2 shows a basic hydraulic and electrical circuit diagram of a second exemplary embodiment of the invention.

FIG. 2 shows the basic circuit diagram of a second exemplary embodiment of the invention. To facilitate association, elements which are the same or have the same action are provided with corresponding reference symbols in all the figures of the drawing. To that extent, reference may be made to the above description.

The exemplary embodiment shown in FIG. 2 differs first of all from the exemplary embodiment illustrated in FIG. 1 in that no only is a first switching valve 8 assigned to the first hydraulic motor 10, but a second switching valve 30 is also assigned to the second hydraulic motor 14. On account of the loading by the spring 22, in the normal position illustrated in FIG. 2 the switching valve 8 is in its first switching position 18, whereas the second switching valve 30 in this normal position is in its first switching position 32 on account of the loading by the spring 31. In this normal position, the first hydraulic motor 10 and the second hydraulic motor 14 are therefore connected in series with the hydraulic pump 2, the first connection 7 of the hydraulic pump 2 being connected via the first working line section 4 and the first switching valve 8 to the first connection 9 of the first hydraulic motor 10, the second connection 12 of the first hydraulic motor 10 being connected via the first switching valve 8, the second working line section 5 and the second switching valve 30 to the first connection 13 of the second hydraulic motor 14, and the second connection 16 of the second hydraulic motor 14 being connected via the second switching valve 30 and the third working line section 6 to the second connection 17 of the hydraulic pump 2.

In the exemplary embodiment illustrated, a feed line 35 is connected to the second working line section 5 via a nonreturn valve 34, in order to replenish pressure fluid which has escaped from the working line 3.

The second working line section 5 is provided with a first pressure sensor 36, which detects the pressure $p_4$ in the second working line section 5. Correspondingly, the third working line section 6 is provided with a second pressure sensor 37, which detects the pressure $p_3$ in the third working line section 6. The pressure sensors 36 and 37 are connected to a control unit 38, an electronic control unit in the exemplary embodiment, which establishes the difference $p_4-p_3$ between the pressures $p_4$ and $p_3$. If the difference $p_4-p_3$ exceeds a present limit value, this signifies that the pressure drop at the first hydraulic motor 10 is relatively small. This indicates a ship at the first drive train 11. In this case, the electromagnet 24 is actuated in order to switch over the first switching valve 8 from the first switching position 18 into the second switching position 19, in which the first hydraulic motor 10 is bypassed. If, conversely, the difference $p_4-p_3$ falls short of a preset limit value, this signifies a relatively small pressure drop at the second hydraulic motor 14. This indicates a slip at the second drive train 15. In this case, an electromagnet 39 is actuated in order to switch over the second valve 30 from its first switching position 32 into its second switching position 33 and thus to bypass the second hydraulic motor 14.

In this exemplary embodiment too, there is provided a timer 23 which periodically transmits a time clock T to the control unit 38. The electrical control unit 38 provisionally switches off the electromagnets 24 and 39 at this time clock T, so that the switching valve 8 or 30 which has been previously switched over returns to its first switching position 18 or 32 again. If a slip still occurs at the assigned drive train 11 or 15, the corresponding switching valve 8 or 30 is immediately switched back into its second switching position 19 or 33 again on account of the above-mentioned control means. If the slip at the corresponding drive train 11 or 15 is however eliminated in the meantime, the switching valves 8 and 30 remain in their respective first switching position 18 or 32.

Figure 3:
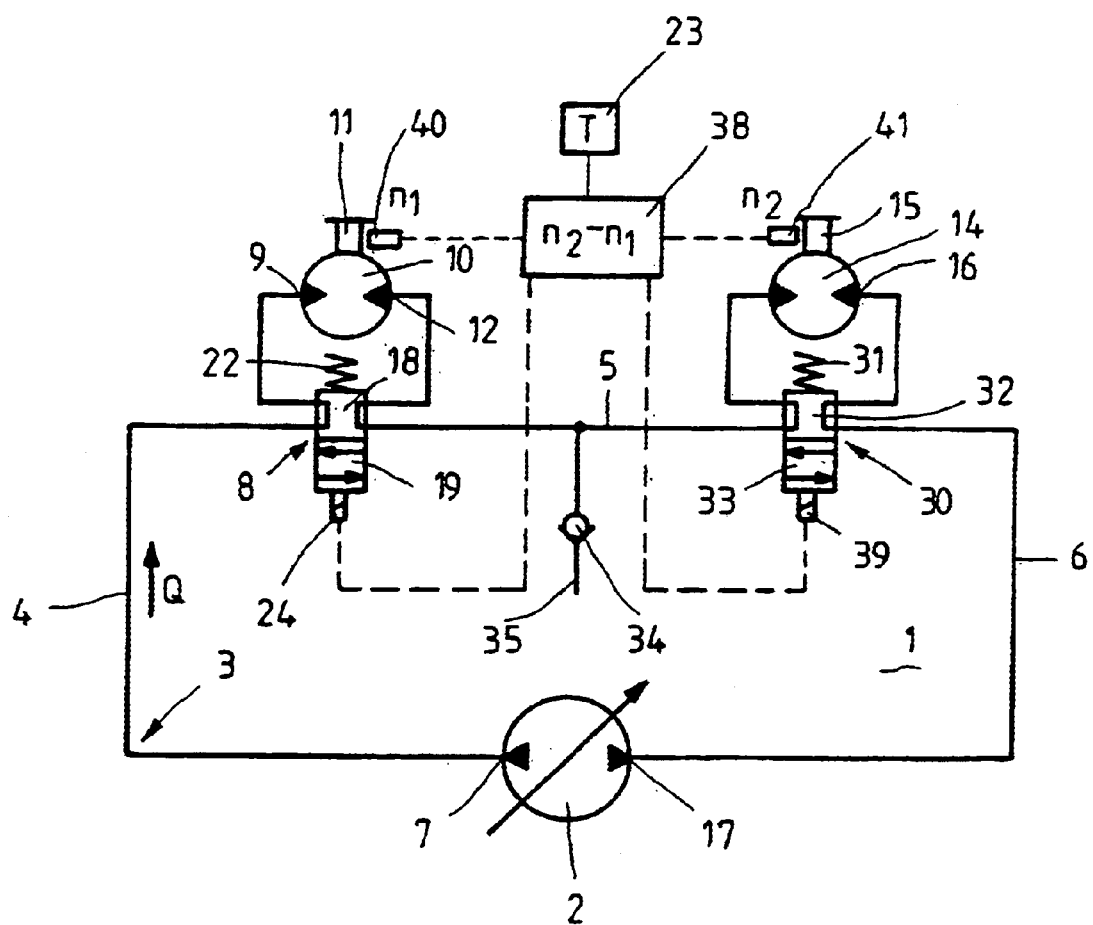
FIG. 3 shows a basic hydraulic and electrical circuit diagram of a third exemplary embodiment of the invention.

FIG. 3 shows a third exemplary embodiment of the hydrostatic drive 1 according to the invention. This exemplary embodiment largely corresponds to the exemplary embodiment already described with reference to FIG. 2, with the difference that the electromagnets 24 and 39 are not driven in dependence on a pressure difference but in dependence on the speeds at the drive trains 11 and 15. For this purpose, a first speed sensor 40 is provided at the first drive train 11 and a second speed sensor 42 is provided at the second drive train 15. In the control unit 38, the difference $n_2-n_1$ between the speed $n_1$ at the first drive train 11 and the speed $n_2$ at the second drive train 15 is determined. If the absolute value of the difference $n_2-n_1$ is greater than a preset limit value, this indicates a slip at one of the two drive trains 11 or 15. In this case, that drive train 11 or 15 which has a greater speed than the other drive train 15 or 11 is subjected to a slip. The electromagnet 24 or 39 of the associated switching valve 8 or 30 is actuated, so that the switching valve 8 or 30 switches over into its second switching state 19 or 33 and the hydraulic motor 10 or 14 of that drive train 11 or 15 which is subjected to a slip is bypassed. Here too the resetting can be triggered by a time clock T generated by a timer 23.

The invention is not restricted to the exemplary embodiment illustrated. In particular, the invention can be employed in the same way when there are more than two hydraulic motors connected in series, the third working line section 6, for example, then connecting the second hydraulic motor 14 not directly to the hydraulic pump 2 but indirectly to the hydraulic pump 2 via a further hydraulic motor or a plurality of further hydraulic motors.

What is claimed is:

1. A hydrostatic drive with at least one hydraulic pump, a first hydraulic motor which is at least indirectly connectable to the hydraulic pump via a first working line section and drives a first drive train, a second hydraulic motor which is at least indirectly connectable via a second working line section to the first hydraulic motor and drives a second drive train, and a third working line section, via which the second hydraulic motor is at least indirectly connectable to the hydraulic pump, characterised in that there is arranged in the first working line section and the second working line section a first switching valve, via which the first working line section is connectable to the second working line section while bypassing the first hydraulic motor, if a slip occurs at the first drive train, and in that there is arranged in the second working line section and the third working line section a second switching valve, via which the second working line section is connectable to the third working line section while bypassing the second hydraulic motor, if a slip occurs at the second drive train.

2. Hydrostatic drive according to claim 1, characterised in that the first switching valve in a first switching position connects a first connection of the hydraulic pump to a first connection of the first hydraulic motor and a second connection of the first hydraulic motor to a first connection of the second hydraulic motor and in a second switching position connects the first connection of the hydraulic pump directly to the first connection of the second hydraulic motor.

3. Hydrostatic drive according to claim 2, characterized in that the first switching valve and/or the second switching valve is switched back from the second switching position into the first switching position by a time clock.

4. Hydrostatic drive according to claim 1, characterized in that the second switching value connects a second connection of the first hydraulic motor to the first connection of the second hydraulic motor and a second connection of the second connection hydraulic pump and in a second switching position connects the second connection of the first hydraulic motor directly to the second connection of the hydraulic pump.

5. Hydrostatic drive according to claim 1, characterized in that the first switching valve and/or the second switching valve is driven by the pressure drop at the first hydraulic motor and/or the second hydraulic motor.

6. Hydrostatic drive according to claim 1, characterized in that the first switching valve switches over from the first switching position into the second switching position if the pressure drop at the first hydraulic motor falls below a preset limit value.

7. Hydrostatic drive according to claim 1, characterized in that the second switching valve switches over form the first switching position into the second switching position if the pressure drop at the second hydraulic motor falls below a preset limit value.

8. Hydrostatic drive according to claim 1, characterized in that the first switching valve switches over from the first switching position into the second switching position if the pressure drop at the second hydraulic motor exceeds a preset limit value.

9. Hydrostatic drive according to claim 1, characterized in that the second switching valve switches over from the first switching position into the second switching position if the pressure drop at the first hydraulic motor exceeds a preset limit value.

10. Hydrostatic drive according to claim 1, characterized in that there are arranged at the first drive train a first speed sensor, which determines the speed at the first drive train, and at the second drive train a second speed sensor, which determines the speed at the second drive train, and in that there is provided a control unit which drives the first switching valve and/or the second switching valve in dependence on the difference of the speeds determined by the speed sensors.

* * * * *